(12) United States Patent
Fang et al.

(10) Patent No.: US 10,440,712 B1
(45) Date of Patent: Oct. 8, 2019

(54) SYSTEMS AND METHODS FOR FREQUENCY ALLOCATION IN A WIRELESS NETWORK

(71) Applicant: Sprint Spectrum LP, Overland Park, KS (US)

(72) Inventors: Zheng Fang, Mclean, VA (US); Roger Danforth Bartlett, Merriam, KS (US); Zheng Cai, Fairfax, VA (US); Yu Wang, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/592,630

(22) Filed: May 11, 2017

(51) Int. Cl.
*H04W 72/04* (2009.01)
*H04W 92/20* (2009.01)

(52) U.S. Cl.
CPC ..... *H04W 72/0453* (2013.01); *H04W 72/048* (2013.01); *H04W 92/20* (2013.01)

(58) Field of Classification Search
CPC . H04W 88/06; H04W 84/12; H04W 72/0453; H04W 24/02; H04W 28/16; H04W 36/14; H04W 48/16; H04W 4/80; H04W 76/10; H04W 88/10; H04W 36/06; H04L 5/0098; H04L 61/2076
See application file for complete search history.

(56) References Cited

U.S. PATENT DOCUMENTS

| 7,796,948 | B2 | 9/2010 | Grosspietsch et al. |
| 2009/0233574 | A1* | 9/2009 | Shinozaki ............ G01S 5/0263 455/404.2 |
| 2011/0029359 | A1 | 2/2011 | Roeding et al. |
| 2013/0235746 | A1* | 9/2013 | Patel .................. H04W 2/0453 370/252 |
| 2013/0287014 | A1* | 10/2013 | Yuk ...................... H04W 88/06 370/338 |
| 2014/0241183 | A1* | 8/2014 | Comeau ............... H04L 5/0098 370/252 |
| 2015/0097731 | A1 | 4/2015 | Russell |
| 2015/0341753 | A1 | 11/2015 | Chen et al. |

* cited by examiner

*Primary Examiner* — Awet Haile (57) ABSTRACT

Systems and methods are described for assigning operating bands to wireless devices of a wireless network. Registration notifications for a plurality of wireless devices are received at an access node. Each of the plurality of wireless devices are classified as either an indoor wireless device or an outdoor wireless device. The access node instructs wireless devices classified as indoor wireless devices to operate on a first operating band. The access node instructs wireless devices classified as outdoor wireless devices to operate on a second operating band.

20 Claims, 5 Drawing Sheets

SYSTEMS AND METHODS FOR FREQUENCY ALLOCATION IN A WIRELESS NETWORK

TECHNICAL BACKGROUND

Wireless networks have developed network architecture(s) and/or protocol(s) to facilitate communications with access nodes and/or wireless devices. These wireless networks may be operated by wireless network operators (or service providers), which network operators coexist with others in a wireless marketplace. Regulatory agencies license the network operators to use distinct, non-overlapping regions, or "carrier bands," of a radio frequency (RF) spectrum. For example, in the United States, the Federal Communications Commission (FCC) holds regulatory authority over RF spectrum. Wireless networks often operate at "high" carrier bands of the licensed RF spectrum, the signals of which carrier bands are typically not capable of penetrating into buildings. Thus, signal indicator(s) and/or a user experience(s) of wireless devices operating in the wireless network tend to degrade (or the wireless device fails to work at all) when the wireless devices move inside a building. Further, wireless devices operating inside the building are susceptible to interference when those wireless devices communicate over short ranges with each other (or with other access nodes) on a carrier band that allows strong external signals to penetrate inside the building. For wireless devices capable of operating on multiple carrier bands, selection of a carrier band based on an indoor and/or outdoor location of the wireless device and whether or not the wireless device wants to connect to/with another wireless device or access node in the building or external to the building could improve overall performance of the wireless device. But, wireless devices do not have mechanisms to determine if they are in a building or external to it. Moreover, wireless devices often operate in a fixed manner (e.g., on a particular carrier band) whether indoors or outdoors.

OVERVIEW

Systems and methods are described for assigning operating bands to wireless devices of a wireless network. In one embodiment, registration notifications are received for a plurality of connected wireless devices at an access node. The access node may classify each of the plurality of wireless devices as either an indoor wireless device or an outdoor wireless device. Wireless devices classified as indoor wireless devices can be instructed by the access node to operate on a first operating band. Wireless devices classified as outdoor wireless devices can be instructed by the access node to operate on a second operating band.

In another embodiment, registration of a wireless device at a second access node can be detected at a first access node. The first access node can determine an operating band of the registered wireless device and compare the operating band to a criteria. When the operating band does not meet the criteria, the first access node instructs the registered wireless device to change operating bands for a period of time.

In yet another embodiment, a registration request can be received at a first access node from a wireless device. The first access node reports a registration status of the wireless device at a second access node. A first operating band of the wireless device can be determined at the second access node based on the registration status of the wireless device. The second access node instructs the wireless device to operate on a second operating band when the first operating band does not meet a criteria. When the second access node detects a change in the registration status of the wireless device, the second access node can instruct the wireless device to resume operation on the first operating band.

Systems and methods are also described for assigning frequency bands to a wireless device in a wireless network. In one embodiment, registration of a wireless device at a second access node may be reported at a first access node. The first access node may detect a frequency band of the registered wireless device. The registered wireless device can be instructed by the first access node to change frequency bands when the frequency band of the registered wireless device does not meet a criteria.

In another embodiment, a registration status of a wireless device can be reported at a first access node by a second access node; the registration status indicates that the wireless device is operating on a first frequency band. The first access node can determine that the first frequency band does not meet a criteria and instruct the wireless device to operate on a second frequency band. The registration status of the wireless device may be monitored at the first access node and, when a change in the registration status of the wireless device is detected, the first access node may instruct the wireless device to operate on the first frequency band.

In yet another embodiment, registration notifications for a plurality of connected wireless devices may be received at an access node. Based on the registration notification, the access node can classify each of the wireless devices as either an indoor wireless device or an outdoor wireless device. A first frequency band may be allocated to wireless devices classified as indoor wireless devices and a second frequency band may be allocated to wireless devices classified as outdoor wireless devices.

DETAILED DESCRIPTION

There are ongoing challenges for wireless devices operating in wireless networks that move between indoor and outdoor environments. For example, to optimize the performance of wireless devices operating in outdoor location environment(s) of wireless networks, wireless network operators often implement network architectures and/or protocols that tend to use "high" carrier bands (or frequency bands) of radio frequency (RF) spectrum licensed to the network operators. But, the signals of high carrier bands are typically not capable of penetrating into buildings. Thus, signal indicator(s) and/or user experience(s) of wireless devices tend to degrade (or the wireless device fails to work at all) when the wireless devices move from an outdoor location environment to an indoor location environment. For example, when a wireless device moves inside a building, the wireless devices is often surrounded by surfaces and/or materials that scatter RF signals (or energy of the signals) of high carrier bands. Further, wireless devices operating inside the building are susceptible to interference when they communicate over short ranges with each other (or with other access nodes and/or access points of the wireless network) on carrier bands that allow strong external signals to penetrate inside the building (e.g., high carrier bands). Thus, a need exists for wireless devices capable of operating on and switching between multiple carrier bands of the RF spectrum based on the location environment of the wireless device.

Figure 1:
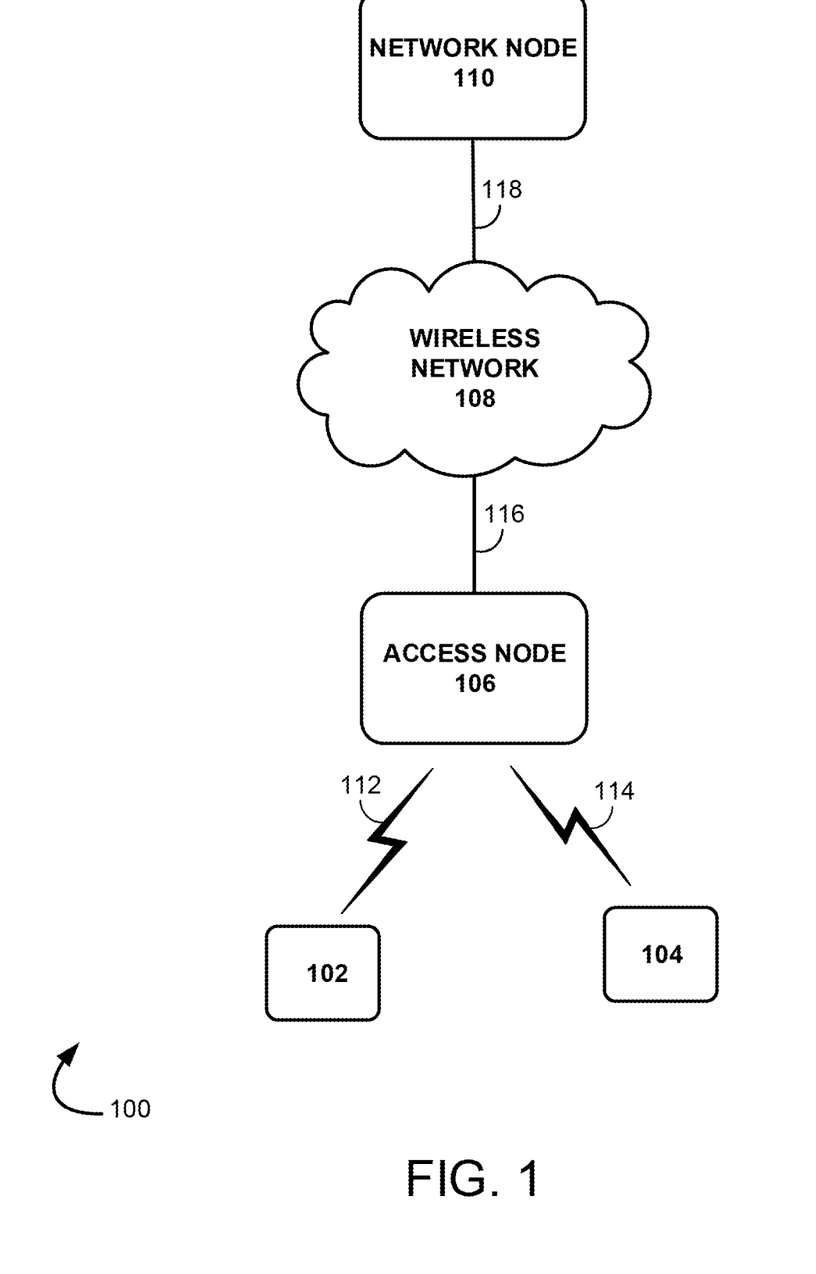
FIG. 1 illustrates an exemplary communication system for assigning operating bands to wireless devices operating in a wireless network.

In operation, wireless devices 102, 104 of wireless network 108 can be configured to operate on and switch between multiple carrier bands (e.g., high carrier bands and low carrier bands) of the RF spectrum based on the location environment of the wireless devices 102, 104. In an exemplary embodiment, access node 106 of wireless network 108 selects carrier bands (e.g., operating bands, RF bands, etc.) for wireless devices 102, 104 based on a detected indoor or outdoor location environment of the wireless device 102, 104 in wireless network 108 and/or another (or other) network. For example, wireless network 108 may be operated by a wireless network operator (or service provider) that coexists with others in a wireless marketplace. A regulatory agency such as the Federal Communications Commission (FCC) can license distinct, non-overlapping regions, or carrier bands, of the RF spectrum to the wireless network operator; these carrier bands can include both high carrier bands and low carrier bands. The wireless network operator configures wireless network 108 to implement network architecture and/or protocol (e.g., Third Generation Partnership Long Term Evolution (3GPP LTE)) at access node(s) 106 of the wireless network 108; based on the implemented network architecture and/or protocol, wireless network 108 may instruct access node 106 and/or connected wireless devices 102, 104 to operate on high carrier bands of the licensed RF spectrum.

As wireless devices 102, 104 move throughout the wireless network 108, the wireless devices 102, 104 may enter an indoor location environment, such as a building, of the wireless network 108 and request attachment to another (or other) access node (or access point) of wireless network 108 and/or an access node (or access point) of another wireless network (not shown). For example, in one embodiment, wireless devices 102, 104 may move inside a building and request attachment to another (or other) access node (or access point) of wireless network 108 and/or another wireless network (not shown) implementing a network architecture and/or protocol different from access node 106 (e.g., a Wireless Fidelity (WiFi) network architecture and/or protocol). After the wireless device 102, 104 attaches to the other access node (or access point) and/or wireless network (not shown), the access node sends an indoor location notification to access node 106 of wireless network 108 indicating that the wireless device 102, 104 has moved from an outdoor location environment of wireless network 108 to an indoor location environment of wireless network 108 and/or another (or other) wireless network. On receipt of the indoor location notification, access node 106 of wireless network 108 checks (or requests information regarding) a current carrier band the wireless device 102, 104 is operating on. If the wireless device 102, 104 is operating on a low carrier band, access node 106 instructs the wireless device 102, 104 to continue operating on the low carrier band until wireless network 108 detects a change in the location environment of wireless device 102, 104. If the current carrier band of the wireless device 102, 104 is a high carrier band, access node 106 instructs wireless device 102, 104 to switch carrier bands such that the wireless devices 102, 104 moves from the high carrier band to a low carrier band of the licensed RF spectrum. Wireless network 108 waits for a set period of time and, after the set period of time expires, sends a polling message via access node 106 to the other access node (or access point) to which wireless device 102, 104 is connected requesting verification (or acknowledgement) that the wireless device 102, 104 switched carrier bands. Access node 106 continues to send polling messages to the other access node (or access point) at, for example, periodic intervals, until the access node 106 receives verification (or acknowledgement) that the wireless device 102, 104 moved from the high carrier band to the low carrier band.

FIG. 1 illustrates an exemplary communication system 100 for assigning carrier bands (e.g., operating bands, RF bands, etc.) to wireless devices operating in a wireless communication network. System 100 can comprise wireless devices 102, 104, access node 106, network node 110, and wireless network 108. Access nodes 106 can further include a data scheduler (not shown). The communications between wireless devices 102, 104 can be relayed, monitored, inspected, and/or scheduled by an inspection module or node (not shown) at access node 106.

Other network elements may be present in the communication system 100 to facilitate communication but are omitted for clarity, such as controller nodes, base stations, base station controllers, gateways, mobile switching centers (MSC), dispatch application processors (DAP), and location registers such as a home location register (HLR) or visitor location register (VLR). Furthermore, other network elements may be present to facilitate communication between wireless devices 102, 104, access node 106, wireless network 108, and network node 110, which are omitted for clarity, including additional processing nodes, routers, gateways, and physical and/or wireless data links for carrying data among the various network elements.

As noted above, wireless devices 102, 104 are capable of operating on multiple carrier bands and can be any device configured to communicate over system 100 using a wireless communication link or interface. Wireless devices 102, 104 can include a cell phone, a smart phone, a computing platform such as a laptop, a palmtop, or a tablet, a personal digital assistant (PDA), an internet access device, and combinations thereof. Wireless devices 102, 104 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, news alerts, etc.

Access node 106 can be any network node configured to provide communication between wireless devices 102, 104 and wireless network 108. Access node 106 can be short range access nodes or standard access nodes. A short range access node could include a microcell base station, a picocell base station, a femtocell base station, relay node, or the like. A standard access node could include base transceiver stations, radio base stations, radio network controllers, an eNodeB device, or an enhanced eNodeB device, a donor eNodeB, or the like.

Access nodes 106 can comprise a processor and associated circuitry to execute or direct the execution of computer-readable instructions to obtain information. Access node 106 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 106 can receive instructions and other input at a user interface.

Wireless network 108 can be a wired and/or wireless communication network, and can comprise processing nodes, routers, gateways, and physical and/or wireless data links for carrying data among various network elements, including combinations thereof, and can include a local area network (LAN), a wide area network (WAN), and an internetwork (including the Internet). Wireless network 108 can be capable of carrying data, for example, to support voice, push-to-talk, broadcast video, and data communications by a wireless device, for example, wireless devices 102, 104. Wireless network protocols can comprise Code Division Multiple Access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by wireless network 108 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Wireless network 108 can also comprise additional base stations, controller nodes, telephony switches, internet routers, network gateways, computer systems, communication links, or some other type of communication equipment, and combinations thereof.

Network node 110 can be any network node configured to communicate information and/or control information over system 100. For example, network node 110 can receive and/or transmit information to/from wireless devices 102, 104 over system 100. While network node 110 is shown in the backhaul of system 100, network node 110 could alternatively be located between access node 106 and wireless network 108. Network node 110 can be a standalone computing device, computing system, or network component, and can be accessible, for example, by a wired or wireless connection, or through an indirect connection such as through a computer network or wireless network. For example, network node 110 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that network node 110 is not limited to any specific technology architecture, such as LTE, and can be used with any network architecture and/or protocol.

Communication links 112, 114, 116, 118 can be wired or wireless and use various communication protocols such as Internet, Internet Protocol (IP), LAN optical networking, Hybrid Fiber Coax (HFC), telephony, T1, or some other communication format—including combinations, improvements, or variations thereof. Wireless communication links 112, 114, 116, 118 can be a radio frequency, microwave, infrared, or other similar signal, and can use a suitable communication protocol, for example, GSM, CDMA, WiMAX, LTE, or combinations thereof. Other wireless protocols can also be used. Links 112, 114, 116, 118 can be a direct link or might include various equipment, intermediate components, systems, and networks.

Figure 2:
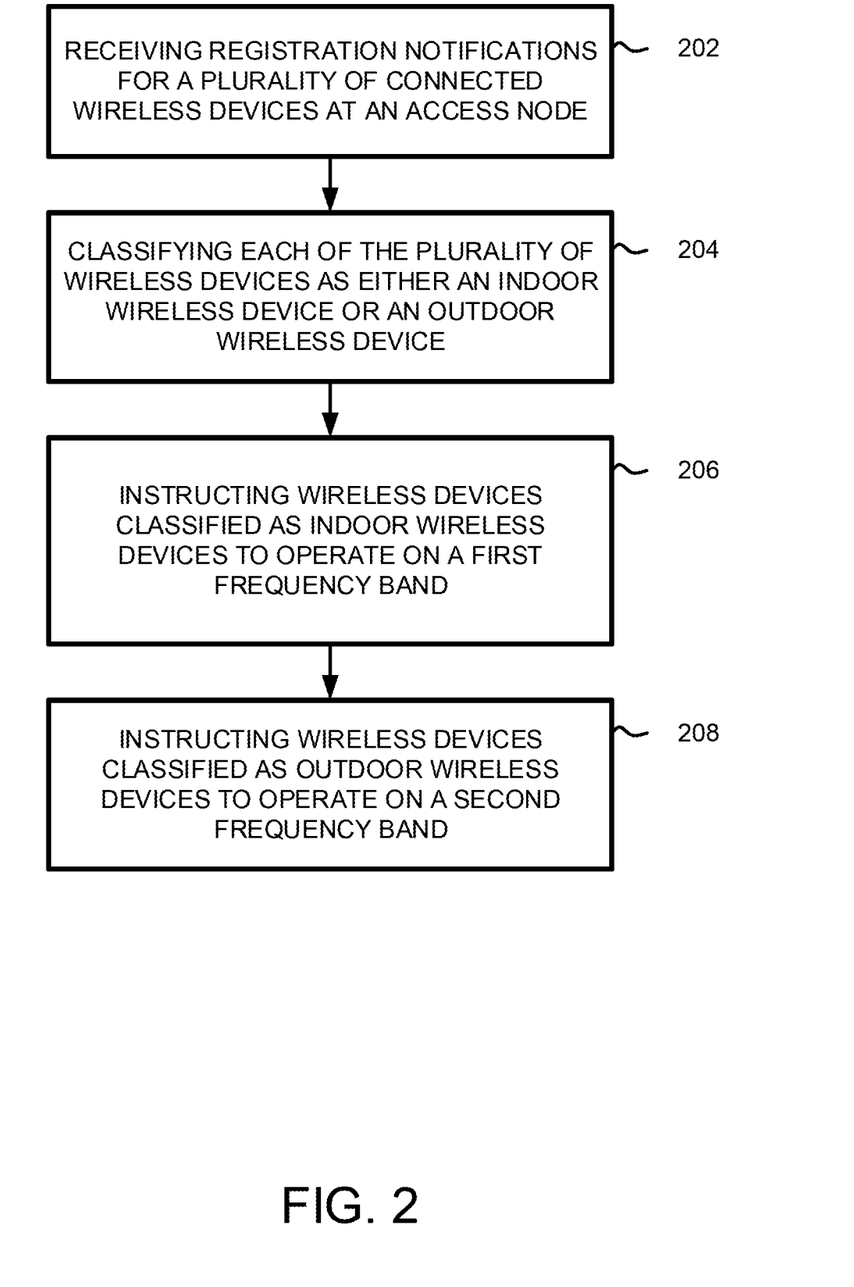
FIG. 2 illustrates an exemplary method for assigning operating bands to wireless devices operating in a wireless network.

FIG. 2 illustrates an exemplary method for assigning carrier bands (e.g., operating bands, RF bands, etc.) to wireless devices operating in a wireless network. The method of FIG. 2 will be discussed with reference to the exemplary communication system 100 illustrated in FIG. 1. But, the exemplary method for assigning carrier bands illustrated in FIG. 2 can be implemented with any suitable communication system. In addition, although FIG. 2 depicts steps performed in a particular order or arrangement, one skilled in the art, using the disclosure provided herein, will appreciate that various steps of the method can be omitted, rearranged, combined, and/or adapted in various ways.

Referring to FIG. 2, at 202 and 204, the wireless network and/or access nodes of the wireless network receive registration notifications for a plurality of wireless devices and classifies each of the plurality of wireless devices as either indoor or outdoor wireless devices. For example, wireless devices 102, 104 can be configured to operate on and change between multiple operating bands (e.g., carrier bands, RF bands, etc.) of RF spectrum licensed to network operators of wireless network 108. When wireless devices 102, 104 initially request attachment to wireless network 108, the wireless devices 102, 104 are positioned at an outdoor location environment of wireless network 108. The wireless network 108 grants the attachment request and instructs wireless devices 102, 104 to communicate over wireless network 108 via access node 106 using a "high" operating band (e.g., carrier band, RF band, etc.) of the licensed RF spectrum. Subsequently, the wireless network classifies these wireless devices 102, 104 as outdoor wireless devices.

But, as wireless devices 102, 104 move throughout wireless network 108, the wireless devices 102, 104 may attach and re-attach to different (or other) access nodes (or access points) of wireless network 108 and/or other wireless or wired networks (not shown); the wireless network 108 can monitor these attachments and/or re-attachments. For example, in one embodiment, wireless devices 102, 104 move from the outdoor location environment to an indoor location environment (e.g., inside a building) supported by, for example, a WiFi network; wireless network 108 can use an alphanumeric character unique identifier (e.g., an SSID) to identify the WiFi network and/or whether the WiFi network is a home network and/or visitor network. That is, wireless network 108 uses the unique identifier coupled with tracking of attachment/re-attachment to the particular WiFi network over a period of time to determine if the WiFi network is a home network and/or visitor network. Upon entering the indoor location environment, wireless devices 102, 104 request attachment to the WiFi network. The WiFi network grants the attachment request and sends a registration notification (e.g., which includes the attachment grant, an identity of the WiFi network, and/or whether the WiFi network is a home network and/or a visitor network) to access node 106 of wireless network 108. Access node 106 uses the registration notification to determine that wireless devices 102, 104 are positioned at an indoor location environment supported by a WiFi network and classifies wireless devices 102, 104 as indoor wireless devices.

At 206, the wireless network and/or access nodes of the wireless network instruct wireless devices classified as indoor wireless devices to operate on a "low" operating band (e.g., carrier band, RF band, etc.) of the licensed RF spectrum. For example, once access node 106 of wireless network 108 receives the registration notification and classifies the wireless devices 102, 104 as indoor wireless devices, the access node 106 checks a current operating band of wireless devices 102, 104. If the wireless devices 102, 104 are operating on a low operating band, access node 106 instructs the wireless devices 102, 104 to remain on (or continue to operate on) the low operating band until the wireless devices 102, 104 move to an outdoor location environment at which point the access node 106 instructs the wireless devices 102, 104 to change to operate on a high operating band. If the wireless devices 102, 104 are operating on a high operating band, access node 106 instructs the wireless devices 102, 104 to change to operate on a low operating band. Wireless network 108 waits for a set period of time and, after the set period of time expires, sends a polling message via access node 106 to the WiFi network requesting verification (or acknowledgement) that wireless devices 102, 104 switched operating bands. Access node 106 continues to send polling messages to the WiFi network at, for example, periodic intervals, until the access node 106 receives verification (or acknowledgement) that wireless devices 102, 104 moved from the high operating band to the low operating band.

At 208, the wireless network and/or access nodes of the wireless network instruct wireless devices classified as outdoor wireless devices to operate on a "high" operating band (e.g., carrier band, RF band, etc.) of the licensed RF spectrum. For example, as wireless devices 102, 104 move from the indoor location environment to an outdoor location environment, the wireless devices 102, 104 request re-attachment to access node 106. After re-attachment, the access node 106 checks a current operating band of wireless devices 102, 104. If the wireless devices 102, 104 are operating on a high operating band, access node 106 instructs the wireless devices 102, 104 to remain on (or continue to operate on) the high operating band until the wireless devices 102, 104 move to an indoor location environment. If the wireless devices 102, 104 are operating on a low operating band, access node 106 instructs the wireless devices 102, 104 to change to operate on a high operating band.

Figure 3:
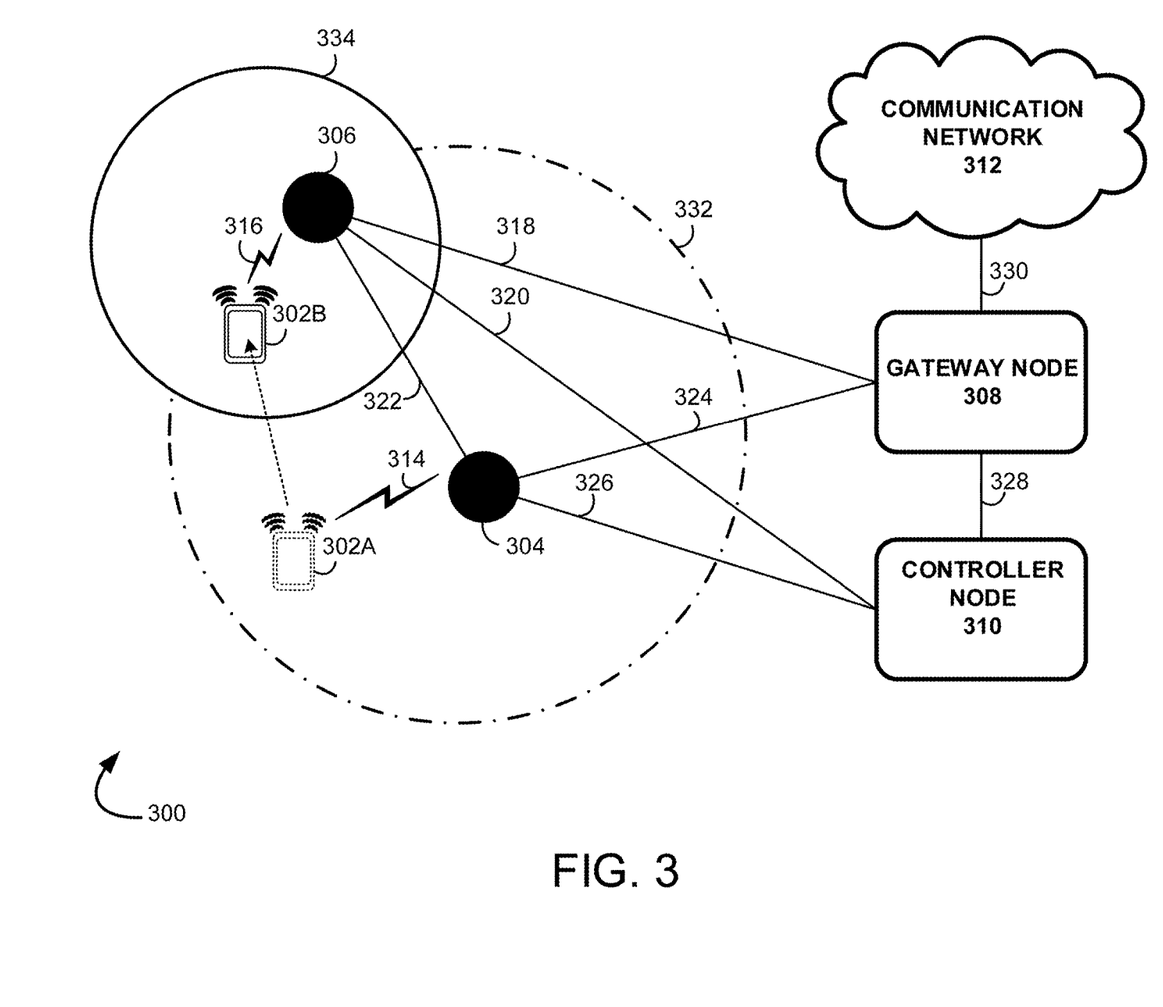
FIG. 3 illustrates another exemplary communication system for allocating frequency bands to wireless devices operating in a wireless network.

FIG. 3 illustrates another exemplary communication system 300 for allocating carrier bands (e.g., operating bands, RF bands, etc.) in a wireless network. System 300 can comprise wireless devices 302A, 302B, access nodes or access points 304, 306 (which can include data schedulers), gateway node 308, controller node 310, and wireless network 313. A scheduler node (not shown) can be included in the backhaul of system 300. The communications between wireless devices 302A, 302B can be relayed, monitored, inspected, and/or scheduled by an inspection module or node (not shown) at access nodes or access points 304, 306 and/or a data scheduler or scheduler node (not shown).

Other network elements may be present in the communication system 300 to facilitate communication but are omitted for clarity, such as controller nodes, base stations, base station controllers, gateways, MSC, DAP, and location registers such as a HLR or VLR. Furthermore, other network elements may be present to facilitate communication between wireless devices 302A, 302B, access nodes or access points 304, 306, etc., and wireless network 312.

As noted above, wireless devices 302A, 302B are capable of operating on multiple carrier bands (e.g., operating bands, RF bands, etc.) and can be any device configured to communicate over system 300 using a wireless communication link or interface. Wireless devices 302A, 302B can include a cell phone, a smart phone, a computing platform such as a laptop, a palmtop, or a tablet, a PDA, an internet access device, and combinations thereof. A wireless interface of wireless devices 302A, 302B can include one or more transceivers for transmitting and receiving data over system 300. Each transceiver can be associated with the same or different frequency bands, the same or different radio access technologies, the same or different network providers (or network operators), and/or the same or different services. For example, wireless devices 302A. 302B can include a transceiver that is associated with one or more of the following: CDMA, GSM, WiMAX, 3GPP LTE, and/or HSPA, IEEE 802.11, WiFi, Bluetooth, Zigbee, IrDA, MBMS, etc.

Wireless devices 302A, 302B can transmit and/or receive information over system 300 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, news alerts, etc.

Wireless devices 302A, 302B can be connected with access nodes or access points 304, 306 through communication links 314, 316. Links 314, 316 can use various communication media, such as air, space, metal, optical fiber, or some other signal propagation path—including combinations thereof. Links 314, 316 may comprise many different signals sharing the same link. Links 314, 316 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless devices 302A, 302B and access nodes or access points 304, 306 could share the same representative wireless link, but be transferred over different communication sessions, frequencies, timeslots, packets, ports, sockets, logical transport links, or in different directions—including combinations thereof.

Access nodes or access points 304, 306 can be any network node configured to provide communication between wireless devices 302A, 302B and wireless network 312. Access nodes or access points 304, 306 can be interfaces, short range access nodes, and/or standard access nodes. A short range access node could include a microcell base station, a picocell base station, a femtocell base station, relay node, or the like. A standard access node could include base transceiver stations, radio base stations, radio network controllers, an eNodeB device, or an enhanced eNodeB device, a donor eNodeB, or the like. Access nodes or access points 304, 306 can use data scheduler(s) and/or coordinate with a scheduler node (not shown) to communicate scheduling decisions (e.g., UL/DL scheduling assignments) to wireless devices 302A, 302B using control information carried by an UL/DL control channel.

Access nodes or access points 304, 306 can comprise a processor and associated circuitry to execute or direct the execution of computer-readable instructions to obtain information. Access nodes or access points 304, 306 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes or access points 304, 306 can receive instructions and other input at a user interface.

Gateway node 308 can be any network node configured to interface with other network nodes using various protocols. Gateway node 308 can communicate user data over system 300. Gateway node 308 can be a standalone computing device, computing system, or network component, and can be accessible, for example, by a wired or wireless connection, or through an indirect connection such as through a computer network or communication network. For example, gateway node 308 can include a Serving Gateway (SGW) and/or a Packet Data Network Gateway (PGW), etc. One of ordinary skill in the art would recognize that gateway node 308 is not limited to any specific technology architecture, such as LTE, and can be used with any network architecture and/or protocol. Moreover, while one gateway node 308 is illustrated in FIG. 3 as being in communication with wireless network 312, one of ordinary skill in the art would recognize that multiple gateway nodes could be in communication with wireless network 312.

Gateway node 308 can comprise a processor and associated circuitry to execute or direct the execution of computer-readable instructions to obtain information. Gateway node 308 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 308 can receive instructions and other input at a user interface.

Controller node 310 can be any network node configured to communicate information and/or control information over system 300. Controller node 310 can be configured to transmit control information associated with a handover procedure. Controller node 310 can be a standalone computing device, computing system, or network component, and can be accessible, for example, by a wired or wireless connection, or through an indirect connection such as through a computer network or communication network. For example, controller node 310 can include a MME, a HSS, a PCRF, an AAA node, a RMS, a SPS, a policy server, etc. One of ordinary skill in the art would recognize that controller node 310 is not limited to any specific technology architecture, such as LTE and can be used with any network architecture and/or protocol. Moreover, while one controller node is illustrated in FIG. 3 as being in communication with wireless network 312, one of ordinary skill in the art would recognize that multiple controller nodes could be in communication with wireless network 312.

Controller node 310 can comprise a processor and associated circuitry to execute or direct the execution of computer-readable instructions to obtain information. Controller node 310 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 310 can receive instructions and other input at a user interface.

Access node or access point 304 can be in communication with gateway node 308 through communication link 324 and with controller node 310 through communication link 326. Access node or access point 304 can be in communication with access node or access point 306 through communication link 322. Access node or access point 306 can be in communication with gateway node 308 through communication link 318 and with controller node 310 through communication link 320. Gateway node 308 can be in communication with controller node 310 through communication link 328 and with wireless network 312 through communication link 330. The communication links can be wired or wireless links and use various communication protocols such as Internet, IP, LAN, optical networking, HFC, telephony, T1, or some other communication format—including combinations, improvements, or variations thereof. The links can be a radio frequency, microwave, infrared, or other similar signal, and can use a suitable communication protocol, for example, GSM, CDMA, WiMAX, or LTE, or combinations thereof. Other wireless protocols can also be used. The links can be a direct link or might include various equipment, intermediate components, systems, and networks.

Wireless network 312 can be a wired and/or wireless communication network, and can comprise processing nodes, routers, gateways, and physical and/or wireless data links for carrying data among various network elements, including combinations thereof, and can include a LAN or WAN, and an internetwork (including the internet). Wireless network 312 can be capable of carrying data, for example, to support voice, PTT, broadcast video, and data communications by a wireless device such as wireless devices 302A, 302B. Wireless network protocols can comprise MBMS, CDMA 1xRTT, GSM, UMTS, HSPA, EV-DO, EV-DO rev. A, 3GPP LTE, and WiMAX. Wired network protocols that may be utilized by wireless network 312 comprise Ethernet, Fast Ethernet, Gigabit Ethernet, Local Talk (such as Carrier Sense Multiple Access with Collision Avoidance), Token Ring, FDDI, ATM. Wireless network 312 can also comprise additional base stations, controller nodes, telephony switches, internet routers, network gateways, computer systems, communication links, or some other type of communication equipment, and combinations thereof.

Figure 4:
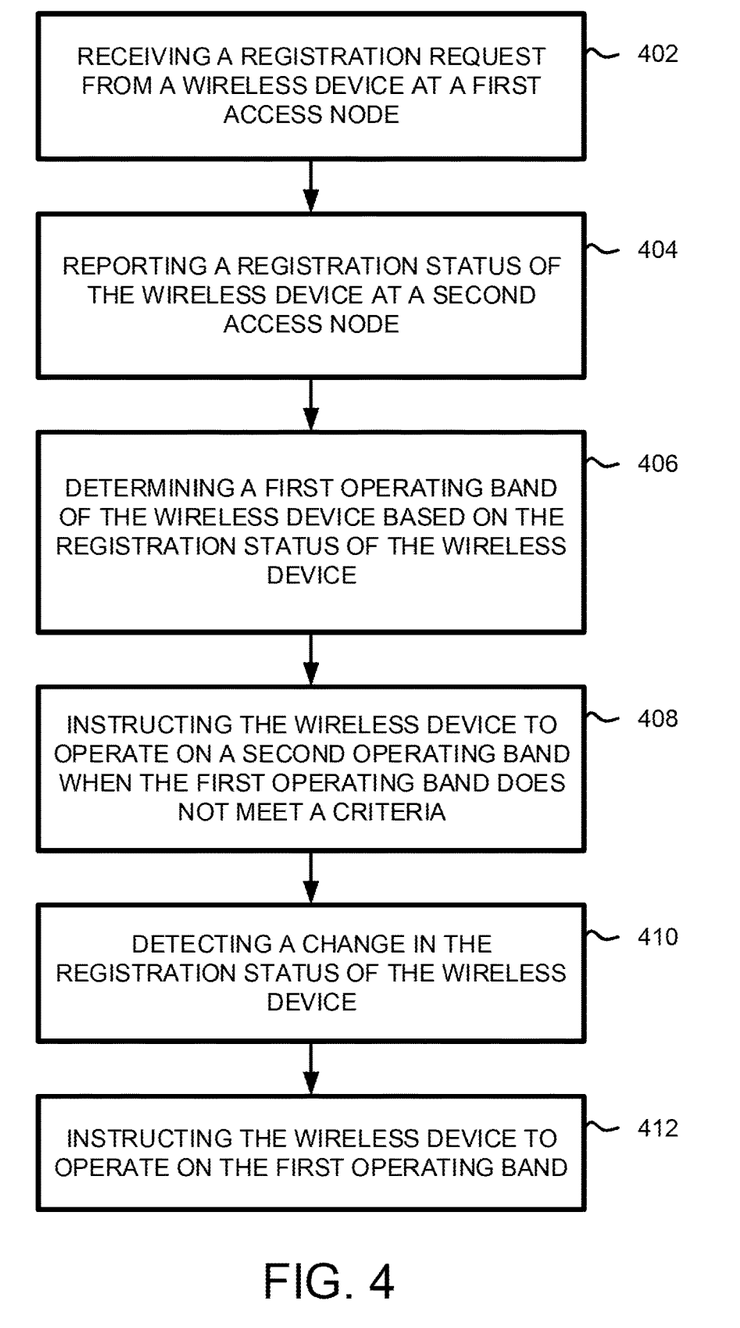
FIG. 4 illustrates an exemplary method for allocating frequency bands to wireless devices operating in a wireless network.

FIG. 4 illustrates another exemplary method for allocating carrier bands (e.g., operating bands, RF bands, etc.) in a wireless network. The method of FIG. 4 will be discussed with reference to the exemplary system 300 illustrated in FIG. 3. But, the exemplary method for allocating carrier bands illustrated in FIG. 4 can be implemented with any suitable communication system. In addition, although FIG. 4 depicts steps performed in a particular order or arrangement, one skilled in the art, using the disclosure provided herein, will appreciate that various steps of the method can be omitted, rearranged, combined, and/or adapted in various ways.

Referring to FIG. 4, at 402, the wireless network and/or an access node of the wireless network receives a registration request from a wireless device. For example, access point 306 (or an interface of access node 306) of wireless network 108 receives an attachment request from wireless device 302B. On receipt of the attachment request, access point 306 grants or denies access to access point 306; wireless network 312 can monitor attachments and re-attachments to access point 306 and can use an alphanumeric character unique identifier (e.g., an SSID) to identify a protocol of the access point 306 (e.g., a WiFi protocol) and/or whether the access point 306 is a home network and/or a visitor network. That is wireless network 312 uses the unique identifier coupled with tracking of attachment/re-attachment to access point 306 over a period of time to determine if the access point 306 is a home network and/or a visitor network.

At 404, the access point reports a registration status of the wireless device at another access point or access node of the wireless network via an interface. For example, when access point 306 grants the attachment request of wireless device 302B, the access point 306 sends a registration notification (e.g., which includes the attachment grant, an identity of the access point 306, and/or whether the access point 306 is a home network and/or a visitor network) to access node 304 using an interface 322 between the access point 306 and access node 304. Access node 304 uses the registration notification to determine that wireless device 302B is positioned at an indoor location environment (e.g., inside a building) supported by an access point 306 operating, for example, a WiFi network protocol and classifies the wireless device 302B as an indoor wireless device.

Alternatively, instead of sending the registration notification associated with the wireless device 302B from access point 306 to access node 304 using interface 322, the wireless device 302B can use, for example, an LTE or other air interface to directly notify access node 304 that it is attached (or registered) at an access point 306 operating a WiFi protocol. For example, wireless network 312 can define a new information element (IE) within an attachment request message (e.g., RRC_ConnectionRequest message) and uplink (UL) information transfer message (e.g., ULInformationTransfer message) sent to access node or access point 304, 306. This new IE can inform the access node or access point 304, 306 of the registration status of the wireless device 302B. In operation, for idle wireless devices 302A, initially registered (or attached) to access node 304 operating an LTE protocol, that move from an outdoor location environment to an access point 306 of an indoor location environment 334 (e.g., an access point registered to a WiFi SSID), the wireless devices 302A are caused to switch into connected mode and report the registration status (e.g., RRC_ConnectionRequest, WiFi registered=TRUE) in a message at access node 304 informing the access node 304 that the wireless device 302A, 302B is registered to both the LTE and WiFi network protocols. For connected wireless devices 302A, 302B initially registered (or attached) to access node 304 operating an LTE protocol, that move from an outdoor location environment to an access point 306 of an indoor location environment 334 (e.g., an access point registered to a WiFi SSID), the wireless devices 302A, 302B report the registration status (e.g., ULInformationTransfer, WiFi registered=TRUE) in a message at access node 304 informing the access node 304 that the wireless device 302A, 302B is registered to both the LTE and WiFi network protocols.

At 406 and 408, the wireless network and/or access node of the wireless network determines an operating band (e.g., carrier band, RF band, etc.) of the wireless device based on the registration status of the wireless device and instructs the wireless device to operate on another operating band when the operating band does not meet a criteria. For example, wireless network 312 and/or access node 304 use the registration notification (or reported registration status) to determine that wireless device 302B is positioned at an indoor location environment supported by an access point 306 (or interface) operating, for example, a WiFi network protocol and to classify the wireless device 302B as an indoor wireless device. After access node 304 determines that wireless device 302B is an indoor wireless device, the access node 304 checks a current operating band of wireless device 302B. If the wireless device 302B is operating on a low operating band, access node 304 instructs the wireless device 302B to remain on (or continue to operate on) the low operating band until the wireless device 302B moves to an outdoor location environment 332 at which point the access node 304 instructs the wireless device 302A to change to operate on a high operating band. If the wireless device 302B is operating on a high operating band, access node 304 instructs the wireless device 302B via access point 306 to change to operate on a low operating band. Wireless network 312 waits for a set period of time and, after the set period of time expires, sends a polling message via access point 306 requesting verification (or acknowledgement) that wireless device 302B switched operating bands. Access node 304 continues to send polling messages to access point 306 at, for example, periodic intervals, until the access node 304 receives verification (or acknowledgement) from access point 306 that wireless device 302B moved from the high operating band to the low operating band.

At 410 and 412, the wireless network and/or access node of the wireless network detects a change in the registration status of the wireless device and instructs the wireless device to change operating bands again. For example, as wireless device 302B moves from the indoor location environment back to an outdoor location environment, the wireless device 302A requests re-attachment to access node 304. After re-attachment, the access node 304 checks a current operating band of the wireless device 302A. If the wireless device 302A is operating on a high operating band, access node 304 instructs the wireless device 302A to remain on (or continue to operate on) the high operating band until the wireless device 302A moves to an indoor location environment. If the wireless device 302A is operating on a low operating band, access node 304 instructs the wireless device 302A to change to operate on a high operating band.

Alternatively, once wireless device 302B moves from the indoor location environment to an outdoor location environment, access point 306 can send a notification to access node 304 informing access node 304 that the wireless device 302A is positioned at an outdoor location environment and/or is no longer positioned at an indoor location environment. Based on the notification, access node 304 can change the operating band of the wireless device 302A from a low operating band to a high operating band. In another embodiment, the wireless device 302A can send a notification to access node 304 to report an updated registration status (e.g., RRC_ConnectionRequest, WiFi registered=FALSE or ULInformationTransfer, WiFi registered=FALSE).

Figure 5:
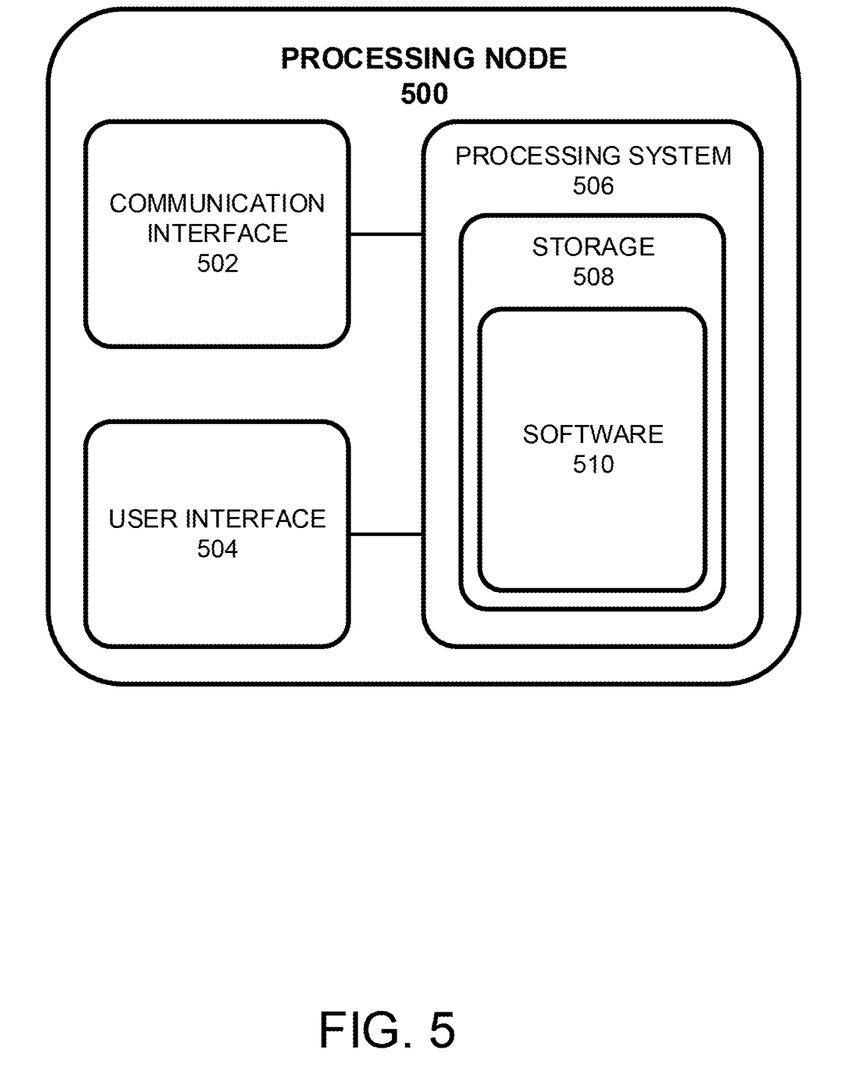
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication access node for a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access nodes or access points 106, 304, 306, network node 110, gateway node 308, and controller node 310. Processing node 500 can also be an adjunct or component of a network element, such as an element of access nodes or access points 106, 304, 306, network node 110, gateway node 308, and controller node 310. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for assigning operating bands in a wireless network, the method comprising:
   detecting, at a first access node, registration of a wireless device at a second access node as an indicator that the wireless device is in an indoor environment or an outdoor environment, wherein the first access node is in the outdoor environment;
   determining, at the first access node, a first operating band of the registered wireless device in communication with the first access node; and
   when the first operating band does not meet a first criteria, instructing the wireless device to change operating bands to a second operating band in communication with the first access node for a period of time, wherein the first and second operating bands are licensed radio frequency (RF) spectrum, the first criteria comprises a low frequency operating band when the wireless device is in the indoor environment, and the first operating band is higher in frequency than the second operating band when the wireless device is in the indoor environment.

2. The method of claim 1, wherein the first access node operates a 3GPP Long Term Evolution (LTE) network protocol.

3. The method of claim 2, wherein the second access node operates a Wireless Fidelity (WiFi) network protocol.

4. The method of claim 1, wherein the first access node and the second access node communicate with each other over an interface.

5. The method of claim 4, wherein the second access node sends a registration notification of the wireless device to the first access node.

6. The method of claim 5, wherein the registration notification includes an identity of the second access node and an attachment grant of the wireless device.

7. The method of claim 1, wherein the first operating band of the wireless device is a high frequency operating band.

8. The method of claim 7, wherein the first criteria is the low frequency operating band.

9. The method of claim 1, wherein the wireless device is in the indoor environment, the first operating band is a high frequency operating band, and the second operating band is the low frequency operating band.

10. A system for assigning operating bands in a wireless network, the system comprising:
    a processing node configured to:
    detect, at a first access node, registration of a wireless device at a second access node as an indicator that the wireless device is in an indoor environment or an outdoor environment, wherein the first access node is in the outdoor environment;
    determine, at the first access node, a first operating band of the wireless device in communication with the first access node; and
    when the first operating band does not meet a first criteria, instruct the wireless device to change operating bands to a second operating band in communication with the first access node for a period of time, wherein the first and second operating bands are licensed radio frequency (RF) spectrum, the first criteria comprises a low frequency operating band when the wireless device is in the indoor environment, and the first operating band is higher in frequency than the second operating band when the wireless device is in the indoor environment.

11. The system of claim 10, wherein the first access node operates a 3GPP Long Term Evolution (LTE) network protocol.

12. The system of claim 11, wherein the second access node operates a Wireless Fidelity (WiFi) network protocol.

13. The system of claim 10, wherein the first access node and the second access node communicate with each other over an interface.

14. The system of claim 13, wherein the second access node sends a registration notification of the wireless device to the first access node.

15. The system of claim 14, wherein the registration notification includes an identity of the second access node and an attachment grant of the wireless device.

16. The system of claim 10, wherein the first operating band of the wireless device is a high frequency operating band.

17. The system of claim 16, wherein the first criteria is the low frequency operating band.

18. The system of claim 10, wherein the wireless device is in the indoor environment, the first operating band is a high frequency operating band, and the second operating band is the low frequency operating band.

19. A method for assigning frequency bands to a wireless device in a wireless network, the method comprising:

reporting, at a first access node, a registration status of a wireless device at a second access node, the registration status indicating that the wireless device is operating on a first frequency band with the first access node, wherein the first access node is in an outdoor environment;

determining, at the first access node, that the first frequency band does not meet a criteria and instructing the wireless device to operate on a second frequency band with the first access node, wherein the first and second frequency bands are licensed radio frequency (RF) spectrum, the criteria comprises a low frequency operating band when the wireless device is in an indoor environment, and the first frequency band is higher in frequency than the second frequency band when the wireless device is in the indoor environment; and monitoring, at the first access node, the registration status of the wireless device and, when a change in the registration status of the wireless device is detected, instructing the wireless device to operate on the first frequency band.

20. The method of claim 19, wherein the registration status of the wireless device at the second access node is indicative of the wireless device being in the indoor environment or the outdoor environment.

* * * * *